Aug. 20, 1929.                P. H. TALBOT                1,725,490
            BOUQUET HOLDER AND DRESS PROTECTOR
                     Filed March 22, 1928

INVENTOR.
P. H. Talbot.
BY
Eccleston & Eccleston
ATTORNEYS.

Patented Aug. 20, 1929.

1,725,490

UNITED STATES PATENT OFFICE.

PHILIP H. TALBOT, OF PORTLAND, MAINE.

BOUQUET HOLDER AND DRESS PROTECTOR.

Application filed March 22, 1928. Serial No. 263,852.

This invention relates to a device for use in connection with bouquets, corsages, etc., and has for its primary object to provide a simple and inexpensive pocket construction of waterproof material which may be readily slipped over the stems of a bouquet so as to eliminate the unsightly appearance of the stems as well as to protect the dress of the wearer from moisture, etc., usually present on the flower stems.

A further object of the invention resides in the provision of a holder and protector which will readily adapt itself to varying sizes of bouquets and which, due to its inherent elasticity, will automatically and firmly lock itself to the bouquet to which it is applied.

Another object of the invention resides in the provision of such a device provided with a sealing medium at its upper end which will closely grip the flower stems and pass between the same to a greater or less extent so as to prevent the escape of any water which may be on the flower stems within the holder.

A still further object of the invention consists in a bouquet holder of elastic material which will serve not only to grip the flower stems but which will also compress tightly against the stems a layer or layers of wet tissue paper, moss or the like, so as to aid in maintaining the flowers in fresh condition.

Figure 1:
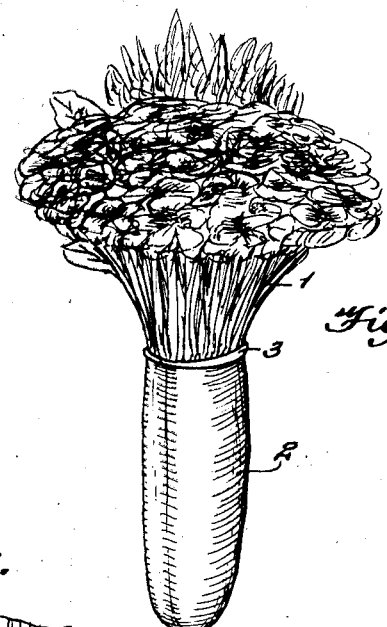

Other objects and advantages of the invention will be apparent from the following description when taken in connection with the accompanying drawing; in which Figure 1 is a perspective view of the bouquet holder and dress protector in use.

Figure 2:
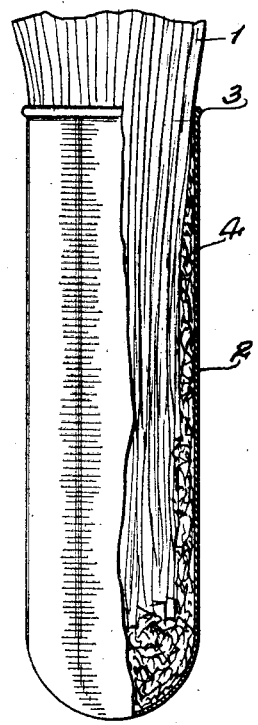
Figure 3:
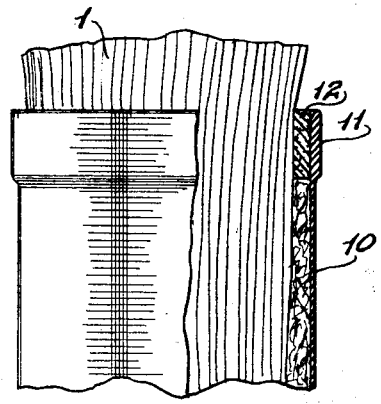

Figure 2 is a side elevational view with parts broken away to show the interior arrangement; and Figure 3 is a similar view of a slightly modified form.

Referring to the drawing in greater detail and especially the Figures 1 and 2, the numeral 1 indicates a bouquet, corsage, or the like, and the numeral 2 designates a combined bouquet holder and dress protector which consists of a substantially cylindrical pocket of very thin, elastic material such as rubber. This pocket is preferably provided with a reinforcing rib 3 at its upper end to prevent tearing of the material as it is placed about the bouquet.

These combined protectors and holders may be made of varying sizes and of different colors as may be found desirable, or may be provided with any preferred form of ornamentation. It will be understood, however, that only a very few different sizes of pockets 2 will be necessary inasmuch as the material from which the pockets are formed is rubber and will therefore readily adapt itself to different sizes of bouquets or corsages.

It is also to be noted that by reason of the thinness of the material as well as its elasticity, the pocket will closely grip the stems of the flowers composing the bouquet or corsage and not only prevent the stems from coming in contact with a dress or the like to which the bouquet is attached, but will also serve in a measure to prevent moisture from escaping from the top of the pocket. Furthermore, where a pocket such as herein described, is employed it is possible to surround the stems of the flowers with one or more layers of wet tissue paper or moss, as indicated by the numeral 4, so as to greatly prolong the life and maintain the freshness of the flowers.

In the modified embodiment of the invention as depicted in Figure 3 of the drawing, the pocket 10, which is also preferably cylindrical and formed of thin elastic material, such as rubber, is provided at its upper end with a reinforcing rib 11. This rib 11 has for its function, in addition to the function as described for the rib 3, to provide a backing for a lining 12 of sponge rubber. This lining is secured to the inner face of the rib 11 at the top of the pocket and when in use this sponge rubber will closely engage the stems of the bouquet at the top of the pocket and serve as a seal to prevent the escape of liquid or moisture from the interior of the pocket, even though the bouquet should be inverted to a greater or less degree.

From the foregoing description taken in connection with the accompanying drawing it is to be observed that I have provided a neat and attractive bouquet or corsage holder and dress protector which may be made in different colors or otherwise ornamented, which will tightly engage the lower ends of the stems of flowers and serve as a binding to clamp against the flower stems moisture holding material such as tissue paper or moss, and which also serves as a seal to prevent the escape of liquid or moisture from the upper end of the pocket.

In accordance with the patent statutes I have described what I now believe to be the preferred embodiments of the invention, but it will be apparent that the invention is susceptible of minor changes and alterations in construction; and all such are intended to be included within the scope of the appended claims.

What I claim as new and desire to secure by Letters Patent is:

1. The combination with a bouquet of one or more layers of moisture retaining material surrounding the stems of the flowers, and a substantially cylindrical pocket of thin, elastic material surrounding the stems and compressing the moisture retaining material against the stems.

2. A bouquet holder and dress protector comprising a substantially cylindrical pocket of thin, elastic material, and a lining of sponge rubber applied to the interior of said pocket at the upper end thereof.

PHILIP H. TALBOT.